Patented Sept. 1, 1925.

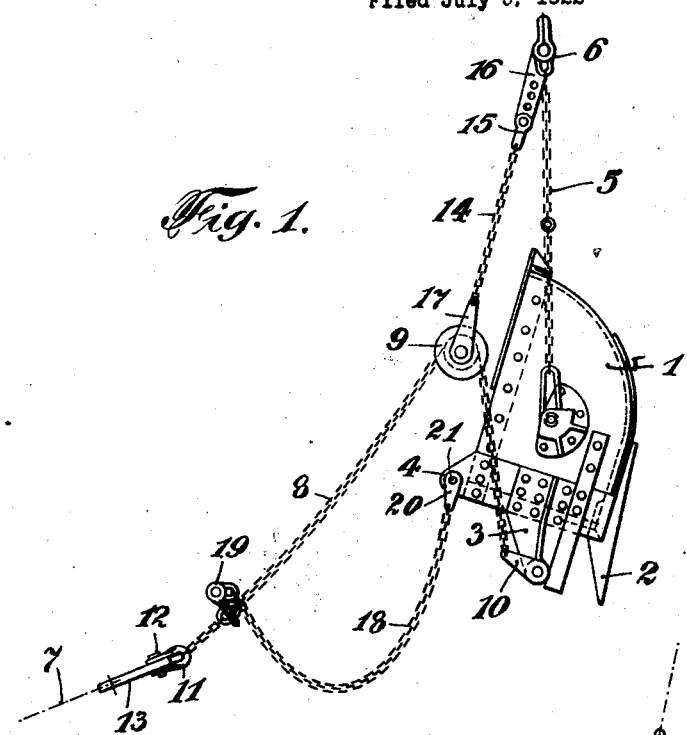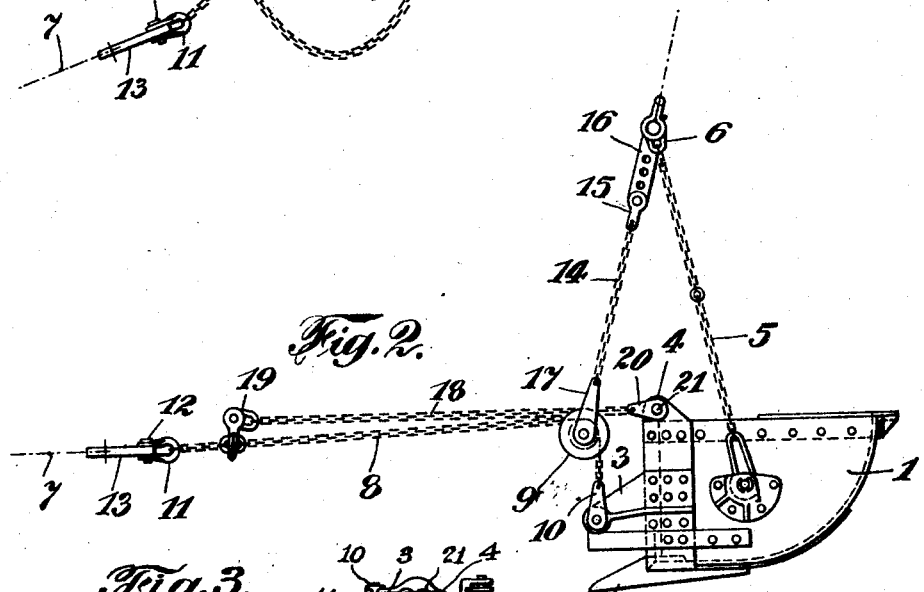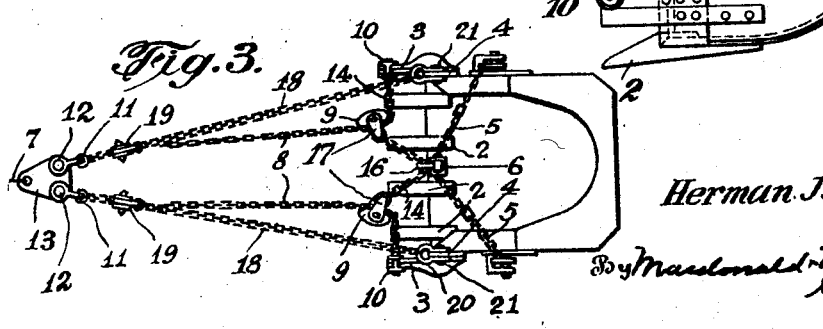

1,552,033

UNITED STATES PATENT OFFICE.

HERMAN J. BRENDLIN, OF NEW YORK, N. Y.

EXCAVATING SHOVEL.

Application filed July 3, 1922. Serial No. 572,491.

*To all whom it may concern:*

Be it known that I, HERMAN J. BRENDLIN, a citizen of the United States, residing at No. 2055 Davidson Avenue, in the city, county, and State of New York, have invented certain new and useful Improvements in Excavating Shovels, of which the following is a specification.

This invention is an improvement upon type of shovel shown in patent to C. A. Morris, No. 1,022,638, of April 9, 1912. In the patent referred to the bucket is connected to the fall-rope by a suspending bridle and to the haul-rope by a draft bridle. A controlling bridle is connected to the draft bridle and the suspending bridle or fall-rope in such manner as to prevent the shovel from tilting during transportation. In practical operation it was found that no adjustment could be made to prevent spilling the load to a certain extent during transportation and also secure a perfect discharge of the load from the shovel at the dump. The present invention is intended to overcome this difficulty.

In the drawings.

Fig. 1 is a side view of the bucket in dumping position,

Fig. 2 is a similar view of the same in loading position, and

Fig. 3 is a plan view of the bucket shown in Fig. 2.

Referring to the drawings in detail, 1 represents the shovel, which is substantially the same as in the patent above referred to, being closed at the bottom and rear, but open at the front and top. At the lower front edge of the bottom, the shovel is provided with digging toes 2, and the front end of the shovel is provided with draft lugs 3 and upstanding ears 4, said draft lugs being intermediate the height of the shovel and the upstanding ears being positioned above the draft lugs. 5 is the suspending bridle, composed of two members which meet at, and are connected to, shackle 6, which is connected to the fall-rope (not shown), and the lower ends of the members composing the bridle are loosely or pivotally connected to the respective sides of the shovel, preferably at points rearwardly of the centre of gravity thereof, substantially as shown in the drawings. Between the shovel and the haul cable 7 is a draft bridle 8, comprised of forwardly converging members, the rear ends of said members passing over pulleys 9 to shackles 10 which are pivotally connected to the draft lugs 3 of the shovel. The forward ends of the draft bridle 8 are connected to shackle 11 pivoted at 12 to shackle-plate 13 connected to drag line 7.

The controlling-bridle 14, is comprised of two upwardly converging members attached at their upper ends to shackle 15, which is connected to shackle-plate 16 and which, in turn, is connected to the fall-rope (not shown). The lower ends of the members of said controlling bridle 14 are connected to shackles 17 of the pulleys 9. The purpose of this controlling bridle is to lift the inner end of the shovel while transporting the load to prevent spilling the contents during transportation. In the patent to Morris, above referred to, this controlling bridle is directly connected to draft bridle 13, and when adjusted to prevent tilting of the bucket during transportation the downward inclination of the bucket in the dumping operation was often insufficient to discharge all of the contents. By the present arrangement the controlling bridle and pulleys, co-operate with the draft bridle to secure the required support for the forward part of the shovel during transportation and a free and perfect downward inclination of the bucket for the dumping operation.

An adjusting bridle 18, composed of two forwardly converging members, is connected at the front end of adjusting shackle 19, and in the rear is connected to shackles 20, attached by bolts 21 to the upstanding ears 4 at the forward upper part of the shovel. The function of the adjusting bridle is the same as in the Morris patent, above referred to, which is to vary the inclination of the shovel and so regulate the depth of cut into the soil.

Having thus described my invention, what I claim is:

1. In a device of the class described the combination of a shovel, a suspending bridle therefor connected to the shovel rearwardly of the center of gravity thereof, a controlling bridle, a pulley connected to the free end of the controlling bridle, and a draft bridle running freely through said pulley.

2. In a device of the class described the combination of a shovel, a suspending bridle therefor connected to the shovel rearwardly of the center of gravity thereof, a controlling bridle, a pulley connected to the free end of the controlling bridle, and a draft bridle running freely through said pulley, and a haul cable connected to said draft bridle.

3. In a device of the class described the combination of a shovel, a haul cable, a suspending bridle connected to the shovel rearwardly of the center of gravity thereof, a controlling bridle, a pulley connected to the lower end of said controlling bridle, a draft bridle running freely through said pulley and having one end connected to the forward part of the shovel and the other end connected to said haul cable.

4. In a device of the class described, the combination of a shovel, a haul cable, a suspending bridle connected to the shovel rearwardly of the center of gravity thereof, a control bridle, a draft bridle having one end connected to the forward part of the shovel and the other end to said haul cable, and means for slidably connecting the control bridle to said draft bridle.

5. In a device of the class described, the combination of a shovel, a haul cable, a suspending bridle connected to the shovel rearwardly of the center of gravity thereof, a controlling bridle, a draft bridle connected at its ends, respectively, with said shovel and said haul cable, and having a free running connection with said controlling bridle, an adjusting bridle, means for fixedly securing one end to said shovel and means for adjusting the other end along said draft bridle.

6. In a device of the class described, the combination of a shovel, a haul cable, a fall rope shackle, a suspending bridle connected to the shovel rearwardly of the center of gravity thereof and composed of two members which meet at and are connected to said fall rope shackle, a control bridle composed of two upwardly converging members connected to said fall rope shackle, each member being connected to a pulley at its lower end, a draft bridle connected to the forward part of the shovel and comprising a pair of forwardly converging members passing over the pulleys connected to said control bridle and meeting at and connected to said haul cable.

HERMAN J. BRENDLIN.